United States Patent
Hong et al.

(10) Patent No.: US 11,809,516 B2
(45) Date of Patent: Nov. 7, 2023

(54) APPARATUS AND METHOD FOR VECTOR COMPUTING INCORPORATING WITH MATRIX MULTIPLY AND ACCUMULATION CALCULATION

(71) Applicant: Shanghai Biren Technology Co., Ltd, Shanghai (CN)

(72) Inventors: Zhou Hong, Shanghai (CN); YuFei Zhang

(73) Assignee: Shanghai Biren Technology Co., Ltd, Shanghai (CN)

( * ) Notice: Subject to any disclaimer, the term of this patent is extended or adjusted under 35 U.S.C. 154(b) by 7 days.

(21) Appl. No.: 17/366,485

(22) Filed: Jul. 2, 2021

(65) Prior Publication Data
US 2022/0121727 A1   Apr. 21, 2022

(30) Foreign Application Priority Data
Oct. 21, 2020   (CN) .......................... 202011132750.6

(51) Int. Cl.
| | |
|---|---|
| G06F 9/30 | (2018.01) |
| G06F 1/16 | (2006.01) |
| G06F 7/57 | (2006.01) |
| G06F 9/38 | (2018.01) |

(52) U.S. Cl.
CPC .................. *G06F 1/16* (2013.01); *G06F 7/57* (2013.01); *G06F 9/3001* (2013.01); *G06F 9/30036* (2013.01); *G06F 9/30043* (2013.01); *G06F 9/3802* (2013.01)

(58) Field of Classification Search
None
See application file for complete search history.

(56) References Cited

U.S. PATENT DOCUMENTS

| | | |
|---|---|---|
| 6,237,079 B1 | 5/2001 | Stoney |
| 10,643,297 B2 | 5/2020 | Mellempudi et al. |
| 2014/0258680 A1 | 9/2014 | Ingle et al. |
| 2018/0095758 A1 | 4/2018 | Dubstov et al. |
| 2019/0171448 A1 | 6/2019 | Chen et al. |
| 2020/0050451 A1* | 2/2020 | Babich ...................... G06T 1/20 |
| 2022/0058237 A1* | 2/2022 | Wang ....................... G06N 3/08 |
| 2022/0066760 A1* | 3/2022 | Chang ..................... G06F 8/458 |

FOREIGN PATENT DOCUMENTS

| | | |
|---|---|---|
| CN | 108845828 A | 11/2018 |
| CN | 110858387 A | 3/2020 |
| TW | 201820125 A | 6/2018 |

* cited by examiner

*Primary Examiner* — John M Lindlof
(74) *Attorney, Agent, or Firm* — Birch, Stewart, Kolasch & Birch, LLP

(57) ABSTRACT

The invention relates to an apparatus for vector computing incorporating with matrix multiply and accumulation (MMA) calculation. The apparatus includes a streaming multiprocessor (SM), and a block selector. The register space is divided into physical blocks, each of which includes register groups, and a general matrix multiply (GEMM) calculation unit. The SM includes a general-purpose register (GPR), and the GEMM calculation unit includes an instruction queue and a arithmetic logical unit (ALU). The ALU coupled to the GPR is arranged operably to perform MMA calculation according to a GEMM instruction stored in the instruction queue, and store a calculation result in the GPR.

16 Claims, 5 Drawing Sheets

APPARATUS AND METHOD FOR VECTOR COMPUTING INCORPORATING WITH MATRIX MULTIPLY AND ACCUMULATION CALCULATION

CROSS-REFERENCE TO RELATED APPLICATIONS

This application claims the benefit of priority to Patent Application No. 202011132750.6, filed in China on Oct. 21, 2020; the entirety of which is incorporated herein by reference for all purposes.

BACKGROUND

The disclosure generally relates to vector computing and, more particularly, to apparatuses and methods for the vector computing integrating with matrix multiply and accumulation (MMA) calculation.

A vector computer is a computer for executing dedicated vector instructions to increase the speed of vector processing. The vector computer can process the data calculation of multiple warps at the same time. Therefore, the vector computer is much faster than the scalar computer in the perspective of warp-data processing. In order to calculate the data of warps, the vector computer is usually equipped with streaming multiprocessor cluster (SMC). In addition, for the computing applications of big data and artificial intelligence, the requirements that the vector computer is capable of MMA calculation are highly increased. Thus, the present invention proposes an apparatus and a method for vector computing that integrates with MMA calculation.

SUMMARY

The disclosure relates to an embodiment of an apparatus for vector computing incorporating with matrix multiply and accumulation (MMA) calculation. The apparatus includes a streaming multiprocessor (SM), and a block selector. The register space is divided into physical blocks, each of which includes register groups, and a general matrix multiply (GEMM) calculation unit. The SM includes a general-purpose register (GPR), and the GEMM calculation unit includes an instruction queue and a arithmetic logical unit (ALU). The ALU coupled to the GPR is arranged operably to perform MMA calculation according to a GEMM instruction stored in the instruction queue, and store a calculation result in the GPR.

The disclosure further relates to an embodiment of a method for vector computing, performed by an SM in coordination with a GEMM calculation unit. The GEMM calculation unit includes a first arithmetic logical unit (ALU), and the SM includes a second ALU. The method includes steps for: reading, by the second ALU when fetching a GEMM instruction, source data from a general-purpose register (GPR) in the SM, and pushing the GEMM instruction, and the source data into an instruction queue in the GEMM calculation unit; and performing, by the first ALU, matrix multiply and accumulation (MMA) calculation according to the GEMM instruction stored in the instruction queue, and storing a calculation result in the GPR in the SM, or a local cache in the GEMM calculation unit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
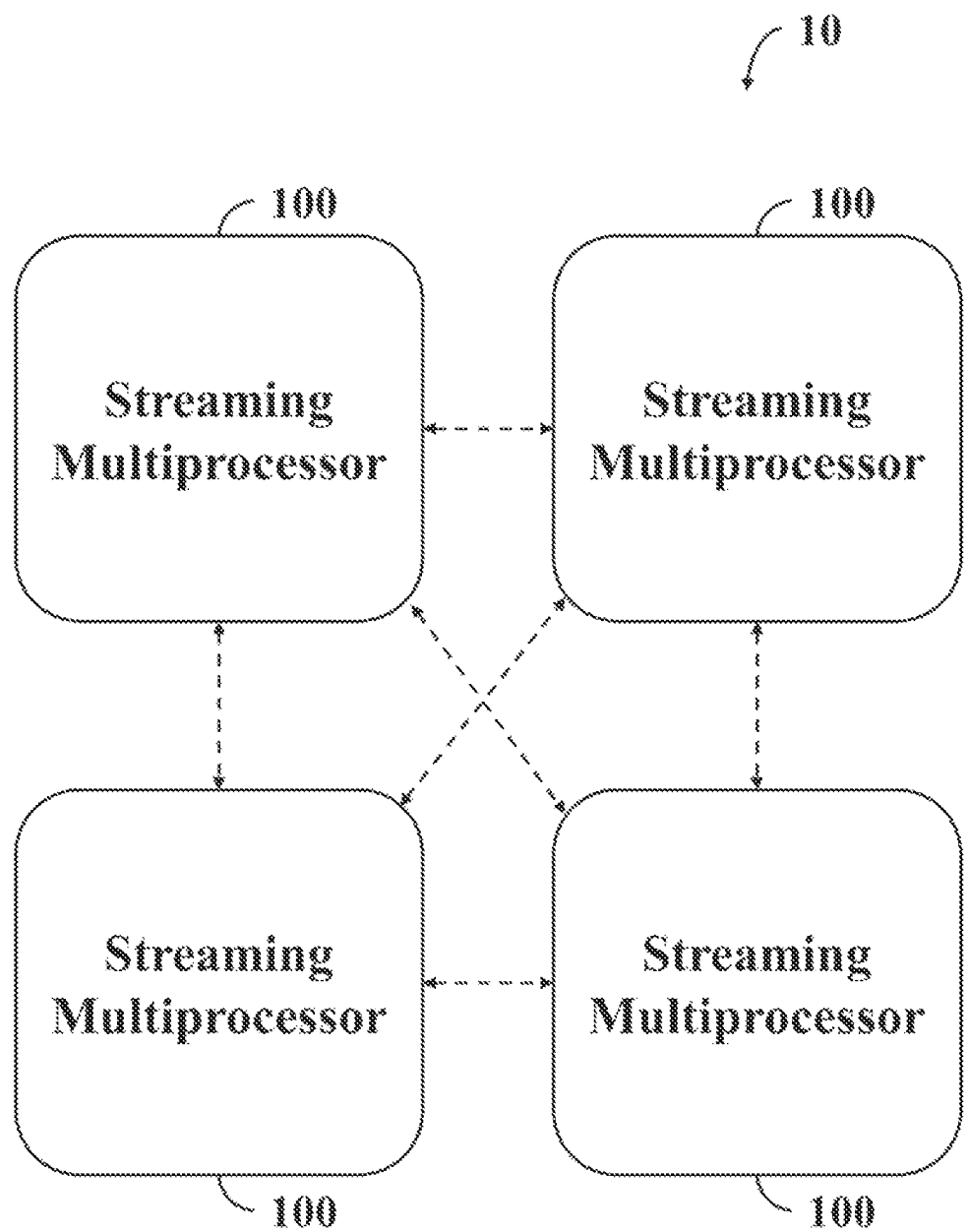
FIG. 1 is a block diagram of a vector computing system.

Refer to FIG. 1. The vector computing system 10 is equipped with a streaming multiprocessor cluster (SMC) containing multiple streaming multiprocessor (SMs) 100, and different SMs 110 uses signals to synchronize their instruction executions for each other. The SMs 100 being programmed may perform a variety of application tasks, including but not limited to linear and non-linear data transformation, database manipulation, big data calculation, artificial intelligence computation, audio and video data encoding and decoding, 3D modeling, image rendering, etc. Each SM 100 can execute multiple warps at the same time, and each warp is composed of group of threads. A thread is the smallest unit that is run by hardware, and has its own life cycle. The warp may be associated with a single instruction multiple data (SIMD) instruction, single instruction multiple thread (SIMT) technology, or others. The execution between different warps may be independent or sequential. The thread may represent a task associated with one instruction, or more. For example, each SM 100 may execute 8 warps at the same time, and each warp includes 32 threads. Although FIG. 1 describes four SMs 100, those artisans may dispose more or less SMs in a vector computing system depending on different design requirements, and the invention should not be limited thereto.

Figure 2:
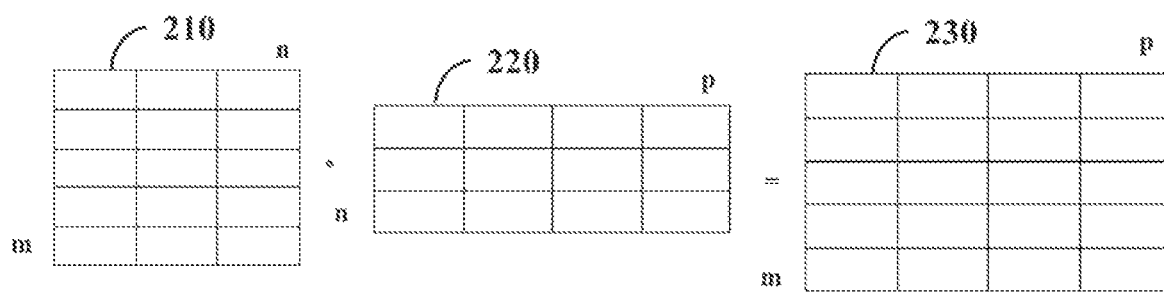
FIG. 2 is a schematic diagram illustrating matrix multiply and accumulation (MMA) calculation.

In some embodiments, in addition to the SMs 110, the vector computer further provides the calculation function of matrix multiply and accumulation (MMA). The MMA calculation are common algorithms in linear algebra, machine learning, big data statistics, artificial intelligence, and other technical fields. The MMA calculation may be represented in the following formula:

$$C=A \times B,$$

representing that the matrix C is generated from two matrices A and B, and the number of columns of the matrix A must be equal to the number of rows of the matrix B. For example, refer to FIG. 2. The matrix A is an m-by-n matrix 210, and the matrix B is an n-by-p matrix 220, which are expressed as follows:

$$A = \begin{pmatrix} a_{11} & \cdots & a_{1n} \\ \vdots & \ddots & \vdots \\ a_{m1} & \cdots & a_{mn} \end{pmatrix}, B = \begin{pmatrix} b_{11} & \cdots & b_{1p} \\ \vdots & \ddots & \vdots \\ b_{n1} & \cdots & b_{np} \end{pmatrix}$$

The matrix C is the dot products of the matrices A and B. The calculation result is a m-by-p matrix 230, which is expressed as follows:

$$C = \begin{pmatrix} c_{11} & \cdots & c_{1p} \\ \vdots & \ddots & \vdots \\ c_{m1} & \cdots & c_{mp} \end{pmatrix}$$

The calculation equation is:

$$c_{ij} = a_{i1}a_{1j} + a_{i2}a_{2j} + \ldots + a_{in}a_{nj} = \sum_{k=1}^{n} a_{ik}a_{kj}$$

where i represents an arbitrary integer ranging from 1 to m, j represents an arbitrary integer ranging from 1 to p, and m, n, and p are constants that may be changed dynamically.

In some implementations, each SM 100 in the vector computer may be equipped with an MMA calculation unit to seamlessly provide the MMA function. However, the ability of each SM 100 to provide matrix operations is limited by the computation capacities of the original SM 100. For example, when each SM 100 contains 64 pipelines for processing 32-bit floating-point (fp32) data, and 256 kilo byte (KB) general-purpose registers (GPRs), the optimized configuration in each SM 100 is to provide the computation capability of 1024 16-bit BFloat (BF16) multiplier-accumulator (MAC) units. If the computation power of configured MAC units significantly exceeds 1024 BF16, it would cause an imbalance in the capacity between the MAC units and the ordinary vector computation.

In alternative implementations, the vector computer may be equipped with a dedicated general matrix multiply (GEMM) processor as a coprocessor for providing the functions of MMA. However, it needs to define a new instruction set architecture (ISA), and would not obtain the advantages of the existing vector computing ISA ecosystem. Another disadvantage would be that consumes excessive computation power in the communications between a local cache in the GEMM processor and the GPRs in the SMs 100 because the SMs 100 are independent from the coprocessor.

In order to eliminate or alleviate the above shortcomings, an embodiment of the invention introduces a vector computing system including multiple SMs and one GEMM calculation unit. The GEMM calculation unit provides the computation capability of MMA. During a calculation, the GEMM calculation unit reads data from a GPR (i.e. a source address) in any SM, and outputs the calculation results to a GPR (i.e. a destination address) in any SM directly, or a local cache in the GEMM calculation unit.

Figure 3:
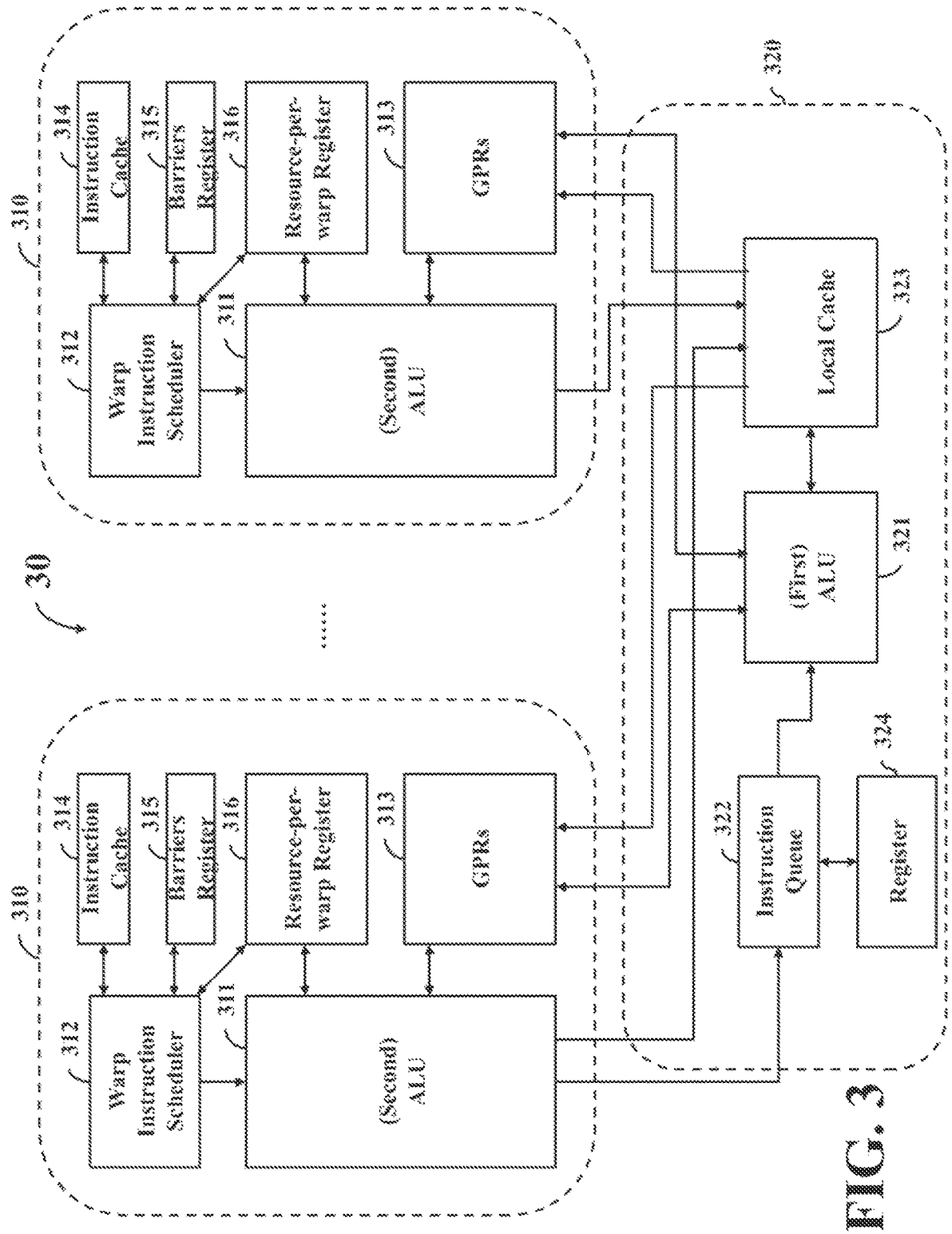
FIG. 3 is a block diagram of an apparatus equipped with a streaming multiprocessor (SM) cluster coordinating with a general matrix multiply (GEMM) calculation unit according to an embodiment of the invention.

Refer to FIG. 3. The vector computing system 30 may be realized in a mainframe, a workstation, a Personal Computer (PC), a laptop PC, a tablet PC, a mobile phone, a digital camera, a digital recorder, or other consumer electronic products. The vector computing system 30 includes multiple SMs 310 and one GEMM calculation unit 320, and the GEMM calculation unit 320 is coupled to the SMs 310. Each SM 310 includes the warp instruction scheduler 312 for fetching a series of instructions for each warp and storing them in the instruction cache 314, and obtaining an instruction to be executed from the instruction cache 314 for each warp according to a program counter (PC). Each warp may have an independent PC register, or share a PC register with other warps, for recording the position (i.e. the address) of the instruction currently being executed. The PC corresponding to the designated warp is normally incremented by one every time after an instruction is fetched from the instruction cache 314. The instruction scheduler 312 sends instructions to the arithmetic logical unit (ALU) 311 for execution at proper time points, where the instructions are defined in the ISA for the specific computing system. The ALU 311 may perform various operations, such as addition and multiplication of integers and floating-point numbers, comparisons, Boolean operations, bit shifts, algebraic functions (e.g. plane interpolation, trigonometric functions, exponential functions, logarithmic functions), etc. The ALU 311 during the executions may read data from designated locations (also referred to as source addresses) of the GPRs 313, and write back execution results in designated locations (also referred to as destination addresses) of the GPRs 313. The GPRs 313 include multiple GPR files and each GPR file is identified by a GPR id. Each SM 310 may further include the barriers register 315 that is used by software in execution to synchronize executions between warps. Each SM 310 may further include the resource-per-warp register 316 that is used by software in execution to dynamically configure the space range of the GPRs 313 that can be accessed by each warp. Although the SMs 310 in FIG. 3 show the components 311 to 316 only, this is merely used to briefly describe the technical features of the present invention, and those artisans would understand that each SM 310 includes more components.

In addition to the instructions originally defined by the ISA, a kernel includes GEMM instructions. When fetching any GEMM instruction, the ALU 311 in the SM 310 does not execute the GEMM instruction, but reads necessary data from the GPRs 313, and then, pushes the GEMM instruction and the read data into the instruction queue 322. In some embodiments, the vector computing system allows the ALU 311 in only one SM 310 (may be referred to as the primary SM) to have a path coupled to the instruction queue 322. Since the ecosystem of vector computing has been properly established in the existing application programming interface (API), such as OpenCL, etc., the programmer writes GEMM instructions in a kernel easily. The following illustrates an exemplary MMA instruction:

MMA dest, src0, src1; //matrix multiply and accumulation wherein the parameters "src0" and "src1" indicates addresses of source matrices A and B, and the parameter "dest" indicates an address of destination matrix for storing the calculation results of A×B. The parameters "src0" and "src1" may be represented by GPR ids to indicate specific GPR files. The parameter "dest" may indicate an address of GPR file or the local cache 323. Similarly, if the parameter "dest" indicates a specific GPR file, it may be represented by a GPR id.

When executing an MMA instruction, the ALU 311 reads data (also referred to as source data) from the designated GPR file in the GPRs 313 according to the parameters "src0" and "src1", and then, sends the operation code (opcode) and the source data of the MMA instruction to the instruction queue 322 in the GEMM calculation unit 320.

Figure 4:
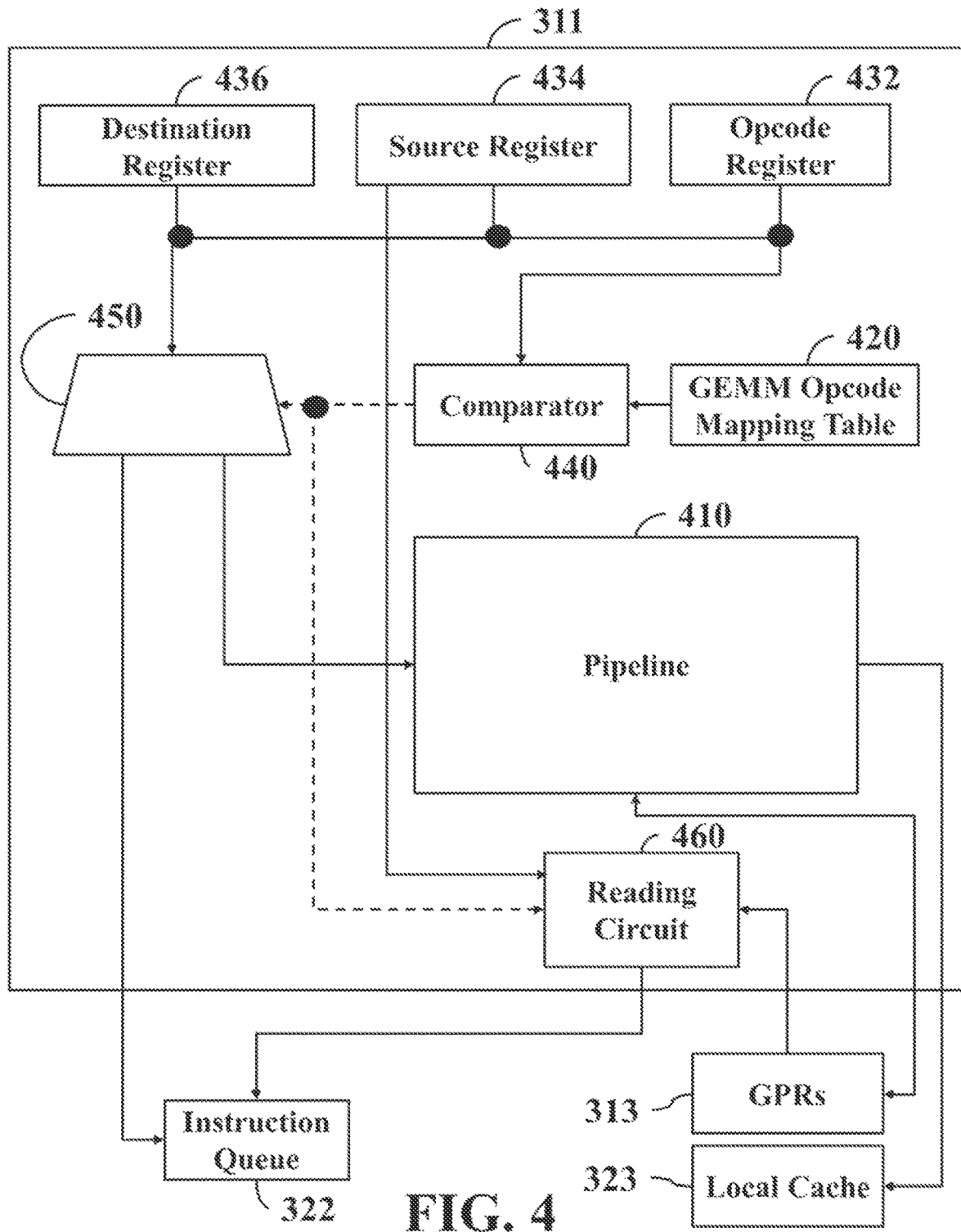
FIG. 4 is a block diagram showing an arithmetic logical unit (ALU) in an SM according to an embodiment of the invention.

In some embodiments, refer to FIG. 4. The ALU 311 includes the opcode register 432, the source register 434, and the destination register 436 for storing the opcode, the source addresses, and the destination addresses of an instruction, respectively, received from the warp instruction scheduler 312. The ALU 311 further includes the GEMM opcode mapping table 420 and the comparator 440. The GEMM opcode mapping table 420 is used to store opcodes of GEMM instructions. The comparator 440 compares the opcode stored in the opcode register 432 and each opcode in the GEMM opcode mapping table 420. The ALU 311 further includes the demultiplexer (DeMUX) 450. The input terminal of the DeMUX 450 is connected to the opcode register 432, the source register 434, and the destination register 436, and the two output terminals of the DeMUX 450 are connected to the pipeline 410 and the instruction queue 322. The ALU 311 further includes the reading circuit 460 whose input terminal is connected to the GPRs 313 and output terminal is connected to the local cache 323. For each instruction, when discovering that the opcode in the opcode register 432 does not match any opcode in the GEMM mapping table 420, the comparator 440 issues a control signal to the DeMUX 450 to make the DeMUX 450 output the content of the opcode register 432, the source register 434, and the destination register 436 to the pipeline 410 for executing the instruction. When discovering that the opcode in the opcode register 432 matches any opcode in the GEMM mapping table 420, the comparator 440 issues a control signal to the DeMUX 450 to make the DeMUX 450 output the content of the opcode register 432, the source register 434, and the destination register 436 to the instruction queue 322 for pushing the GEMM instruction into the instruction queue 322. Moreover, when discovering that the opcode in the opcode register 432 matches any opcode in the GEMM mapping table 420, the comparator 440 issues a control signal to the reading circuit 460 to drive the reading circuit 460 to read source data from a particular GPR file according to a GPR id stored in the source register 434, and store the source data in a designated address of the instruction queue 322. Although FIG. 4 illustrates that the opcode register 432, the source register 434, and the destination register 436 are set in the ALU 311, those artisans may set the opcode register 432, the source register 434, and the destination register 436 outside of the ALU 311, and the invention should not be limited thereto.

Refer back to FIG. 3. The GEMM calculation unit 320 includes the ALU 321, the instruction cache 322, the local cache 323, and the register 324. The instruction queue 322 stores the MMA instruction, and the source data received from the ALU 311 in the designated SM 310 in the First-in-first-out (FIFO) manner. The ALU 321 may obtain the source data from the designated location of the instruction queue 322 and store the source data in a local random access memory (RAM) (not shown in FIG. 3) first. Once the source data is prepared already, the ALU 321 performs the MMA calculation, and stores the calculation results in the designated location of the local cache 323, or the GPRs 313 according to information about the destination address in the MMA instruction. It would avoid the consumption of time and bus bandwidth for data migration between the local cache 323 and the GPRs 313 when the ALU 321 directly stores the calculation results in a specific file in the GPRs 313. Although the GEMM calculation unit 320 in FIG. 4 illustrates the components 321 to 324 only, this is merely used to briefly describe the technical features of the present invention, and those artisans would understand that the GEMM calculation unit 320 includes more components.

The ALU 311 further executes a cross-domain store instruction and a cross-domain load instruction for migrating data between the GPRs 313 and the local cache 323. The following shows an exemplary cross-domain store instruction:

Store dest, src; //data from a GPR file into an address of the local cache where the parameter "src" includes an identifier (id) of designated GPR file, and the parameter "dest" includes a specific address of the local cache 323.

The following shows an exemplary cross-domain load instruction:

Load dest, src; //data from an address of the local cache into a GPR file where the parameter "src" includes a specific address of the local cache 323, and the parameter "dest" includes an identifier of designated GPR file.

Refer to FIG. 4. When discovering that the opcode of the cross-domain store instruction does not match any opcode in the GEMM mapping table 420, the comparator 440 issues a control signal to the DeMUX 450 to make the DeMUX 450 output the content of the opcode register 432, the source register 434, and the destination register 436 to the pipeline 410. The ALU 311 executes the cross-domain store instruction to read source data from the designated GPR file indicated by the parameter "src", and store the source data in the designated address of the local cache 323 indicated by the parameter "dest".

When discovering that the opcode of the cross-domain load instruction does not match any opcode in the GEMM mapping table 420, the comparator 440 issues a control signal to the DeMUX 450 to make the DeMUX 450 output the content of the opcode register 432, the source register 434, and the destination register 436 to the pipeline 410. The ALU 311 executes the cross-domain load instruction to read source data from the designated address of the local cache 323 indicated by the parameter "src", and store the source data in the designated GPR file indicated by the parameter "dest".

Moreover, the application of the aforementioned architecture would achieve parallel computation of the GEMM instructions and the vector computing instructions, so that while the GEMM calculation unit 320 is working, the SMs 310 are also working. Specifically, after pushing the GEMM instructions into the instruction queue 322 and determining that the next vector computing instruction does not need to wait for the execution results of the pushed GEMM instruction, the ALU 311 executes the next vector computing instruction promptly, so that the ALU 321 executes the GEMM instruction and the ALU 311 executes the vector computing instruction in parallel at the same time to improve the overall performance of the vector computing system 30.

In some embodiments, the GEMM calculation unit 320, coupled to sixteen SMs 310, performs 16 K (i.e. 16×1024) MMA calculation in every clock cycle. Such the configuration would achieve better balance between the GEMM computing power and the vector computing power in the application of artificial intelligence.

Figure 5:
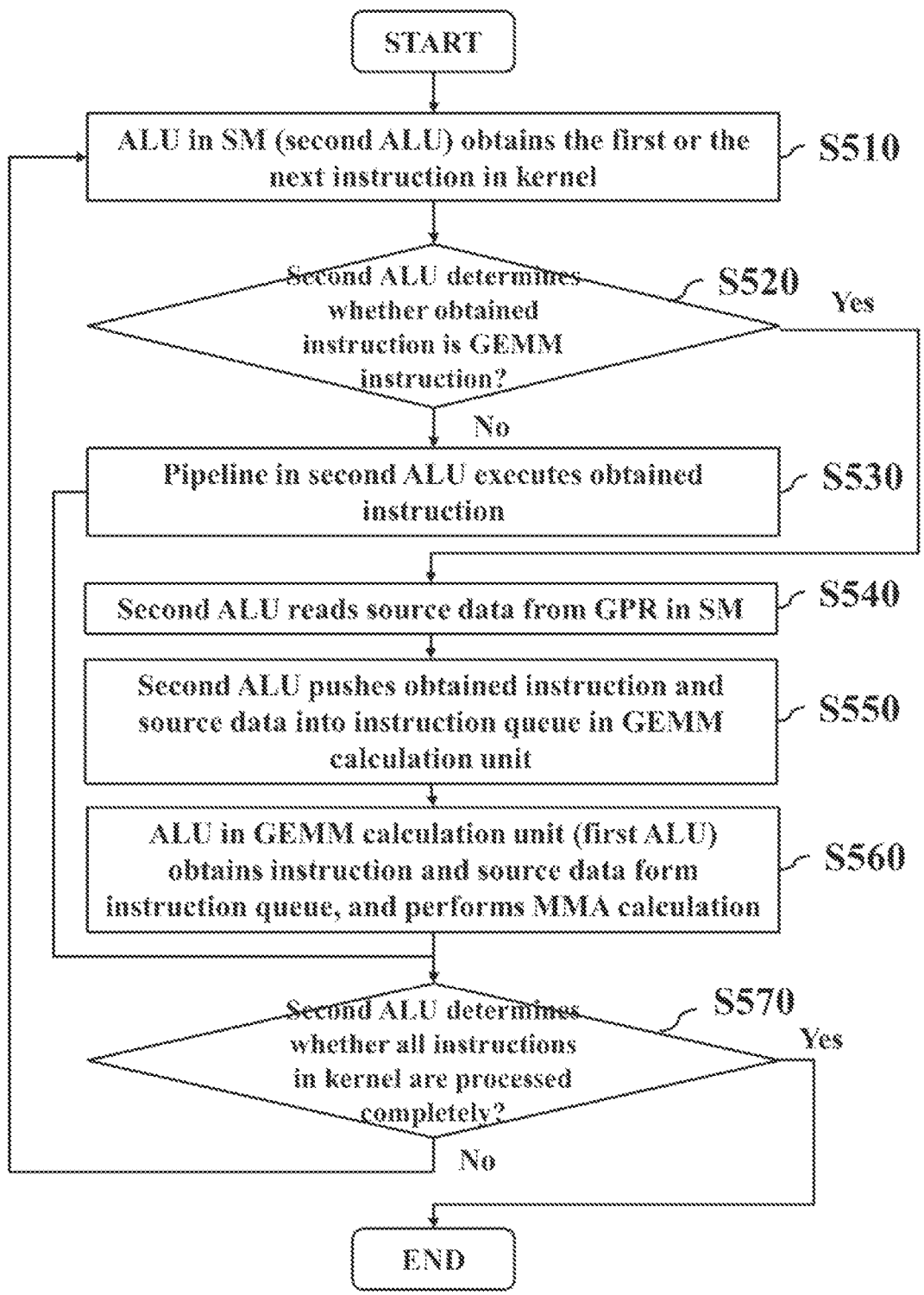
FIG. 5 is a flowchart of a method for vector computing incorporating with MMA calculation according to an embodiment of the invention.

In some embodiments, refer to FIG. 5 illustrating the method for vector computing incorporating with MMA calculation. The method is performed by the SM 310 in coordination with the GEMM calculation unit 320 to repeatedly execute a loop until all instructions in a kernel are processed completely. Detailed steps are described as follows:

Step S510: The ALU 311 in the SM 310 (also referred to as second ALU hereinafter) obtains the first or the next instruction in the kernel.

Step S520: The second ALU determines whether the obtained instruction is a GEMM instruction. If so, the process proceeds to step S540. Otherwise, the process proceeds to step S530.

Step S530: The pipeline in the second ALU executes the obtained instruction, such as the cross-domain store command, the cross-domain load command, etc.

Step S540: The second ALU reads source data from the designated GPR file of the GPRs 313 in the SM 310 according to the source parameter of the obtained instruction.

Step S550: The second ALU pushes the obtained instruction and the source data into the instruction queue 322 in the GEMM calculation unit 320, where the instruction includes the opcode and the destination parameter.

Step S560: The ALU 321 in the GEMM calculation unit 320 (also referred to as first ALU) obtains the instruction and the source data from the instruction queue 322, and performs the MMA calculation. The calculation results are stored in the designated address of the local cache 323 or the designated GPR file in the GPRs 313 according to the content of destination parameter.

Step S570: The second ALU determines whether all instructions of the kernel are processed completely. If so, the whole process ends. Otherwise, the process proceeds to step S510.

Although the embodiment has been described as having specific elements in FIGS. 3, and 4, it should be noted that additional elements may be included to achieve better performance without departing from the spirit of the invention. Each element of FIGS. 3, and 4 is composed of various circuits and arranged to operably perform the aforementioned operations. While the process flows described in FIG. 5 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for vector computing incorporating with matrix multiply and accumulation (MMA) calculation, comprising:
a streaming multiprocessor (SM), comprising a general-purpose register (GPR); and
a general matrix multiply (GEMM) calculation unit, comprising an instruction queue and a first arithmetic logical unit (ALU),
wherein the first ALU coupled to the GPR is arranged operably to perform MMA calculation according to a GEMM instruction stored in the instruction queue, and store a calculation result in the GPR,
wherein the SM comprises a second ALU, the second ALU coupled to the instruction queue is arranged operably to: when a fetched instruction is the GEMM instruction, obtain source data from the GPR, and push the GEMM instruction and the source data into the instruction queue,
wherein the second ALU comprises:
a GEMM operation code (opcode) mapping table, arranged operably to store a first opcode of the GEMM instruction;
a demultiplexer, comprising an input terminal, a first output terminal, and a second output terminal, wherein the input terminal is coupled to an opcode register and a source register the opcode register is arranged operably to store a second opcode, the source register is arranged operably to store a first address in the GPR, the first output terminal is coupled to a pipeline, and the second output terminal is coupled to the instruction queue;
a reading circuit, coupled to the GPR and the instruction queue; and
a comparator, coupled to the GEMM opcode mapping table and the demultiplexer, arranged operably to determine whether the first opcode matches the second opcode; and when the first opcode matches the second opcode, output a first control signal to the demultiplexer to output the second opcode to the instruction queue, and output a second control signal to the reading circuit so as to drive the reading circuit to read the source data from the first address in the GPR, and output the source data to the instruction queue.

2. The apparatus of claim 1, wherein the input terminal is coupled to a destination register, the destination register is arranged operably to store a second address in the GPR; and the comparator is arranged operably to: when the first opcode matches the second opcode, output the first control signal to the demultiplexer to output the second address to the instruction queue, thereby enabling the first ALU to store the calculation result in the second address in the GPR.

3. The apparatus of claim 2, wherein the first address and the second address are represented by identifiers of GPR files.

4. The apparatus of claim 1, wherein the input terminal is coupled to a destination register, the destination register is arranged operably to store a second address; the second ALU comprises the pipeline; the comparator is arranged operably to: when the first opcode does not match the second opcode, output the first control signal to the demultiplexer to output the second opcode, the first address, and the second address to the pipeline.

5. The apparatus of claim 4, wherein the first opcode is associated with a cross-domain store instruction; the pipeline is arranged operably to: when executing the cross-domain store instruction, read source data from a GPR file in the GPR, and store the source data in a local cache in the GEMM calculation unit.

6. The apparatus of claim 4, wherein the first opcode is associated with a cross-domain load instruction; the pipeline is arranged operably to: when executing the cross-domain load instruction, read source data from a local cache in the GENE calculation unit, and store the source data in a GPR file in the GPR.

7. The apparatus of claim 1, wherein the second ALU is arranged operably to: when the fetched instruction is not the GEMM instruction, use a pipeline in the second ALU to execute the fetched instruction.

8. The apparatus of claim 1, wherein the GEMM calculation unit, coupled to sixteen SMs, is arranged operably to perform 16K MMA calculation in every clock cycle.

9. The apparatus of claim 1, wherein the SM and the GEMM calculation unit are arranged operably to perform different types of computation in parallel.

10. A method for vector computing, performed by a streaming multiprocessor (SM) in coordination with a general matrix multiply (GEMM) calculation unit, wherein the GEMM calculation unit comprises a first arithmetic logical unit (ALU), and the SM comprises a second ALU, the method comprising:
reading, by the second ALU when fetching a GEMM instruction, source data from a general-purpose register (GPR) in the SM, and pushing the GEMM instruction, and the source data into an instruction queue in the GEMM calculation unit;
performing, by the first ALU, matrix multiply and accumulation (MMA) calculation according to the GEMM instruction stored in the instruction queue, and storing a calculation result in the GPR in the SM, or a local cache in the GEMM calculation unit; and
storing, by the first ALU, the calculation result in a designated GPR file in the GPR, or a designated address in the local cache according to the content of the destination parameter,
wherein the second ALU comprises:
a GEMM operation code (opcode) mapping table, arranged operably to store a first opcode of the GEMM instruction;
a demultiplexer, comprising an input terminal, a first output terminal, and a second output terminal, wherein the input terminal is coupled to an opcode register, and a source register the opcode register is arranged operably to store a second opcode, the source register is arranged operably to store a first address in the GPR, the first output terminal is coupled to a pipeline, and the second output terminal is coupled to the instruction queue;
a reading circuit, coupled to the GPR and the instruction queue; and
a comparator, coupled to the GEMM opcode mapping table and the demultiplexer, arranged operably to determine whether the first opcode matches the second opcode; and when the first opcode matches the second opcode, output a first control signal to the demultiplexer to output the second opcode to the instruction queue, and output a second control signal to the reading circuit so as to drive the reading circuit to read the source data from the first address in the GPR, and output the source data to the instruction queue.

11. The method of claim 10, wherein the input terminal is coupled to a destination register, the destination register is arranged operably to store a second address in the GPR; and the comparator is arranged operably to: when the first opcode matches the second opcode, output the first control signal to the demultiplexer to output the second address to the instruction queue, thereby enabling the first ALU to store the calculation result in the second address in the GPR.

12. The method of claim 11, wherein the first address and the second address are represented by identifiers of GPR files.

13. The method of claim 10, wherein the input terminal is coupled to a destination register, the destination register is arranged operably to store a second address; the second ALU comprises the pipeline; the comparator is arranged operably to: when the first opcode does not match the second opcode, output the first control signal to the demultiplexer to output the second opcode, the first address, and the second address to the pipeline.

14. The method of claim 10, comprising:
reading, by a pipeline in the second ALU when fetching a cross-domain store instruction, data from the GPR, and storing the read data in the local cache.

15. The method of claim 10, comprising:
reading, by a pipeline in the second ALU when fetching a cross-domain load instruction, data from the local cache, and storing the read data in the GPR.

16. The method of claim 10, wherein the GEMM calculation unit, coupled to sixteen SMs, is arranged operably to perform 16K MMA calculation in every clock cycle.

* * * * *